United States Patent
Aselage (10) Patent No.: US 9,120,450 B1
(45) Date of Patent: Sep. 1, 2015

(54) ACTIVE BOLSTER WITH SPINE REINFORCED WELD TRACK

(71) Applicant: FORD GLOBAL TECHNOLOGIES, LLC, Dearborn, MI (US)

(72) Inventor: Brandon M. Aselage, White Lake, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/289,887

(22) Filed: May 29, 2014

(51) Int. Cl.
  *B60R 21/045* (2006.01)
  *B29C 65/02* (2006.01)
  *B60R 21/205* (2011.01)
  *B60R 21/04* (2006.01)

(52) U.S. Cl.
  CPC ............... *B60R 21/045* (2013.01); *B29C 65/02* (2013.01); *B60R 21/205* (2013.01); *B60R 2021/0407* (2013.01)

(58) Field of Classification Search
  CPC .... B29C 65/02; B29C 65/12; B29C 65/3476; B29C 66/3034; B60R 2021/0407; B60R 21/045; B60R 21/04
  USPC .................... 156/91, 92, 308.2, 309.6, 308.4; 219/633
  See application file for complete search history.

(56) References Cited

U.S. PATENT DOCUMENTS

| | | | |
|---|---|---|---|
| 6,726,967 B2 | 4/2004 | Vorenkamp et al. | |
| 8,454,054 B1 | 6/2013 | Raines | |
| 8,474,868 B2 | 7/2013 | Kalisz et al. | |
| 8,491,008 B2 | 7/2013 | Roychoudhury et al. | |
| 8,544,879 B1 | 10/2013 | Mazzocchi et al. | |
| 9,067,557 * | 6/2015 | Aselage et al. | 1/1 |
| 2008/0061537 A1* | 3/2008 | Enders | 280/730.1 |

* cited by examiner

*Primary Examiner* — Ruth Ilan
(74) *Attorney, Agent, or Firm* — Vichit Chea; MacMillan, Sobanski & Todd, LLC (57) ABSTRACT

An active bolster for an interior trim surface of an automotive vehicle has a plastic-molded outer trim panel with a closed-loop bonding section on an inside surface. A plastic-molded expandable bladder member has a central attachment section configured to attach to a support structure of the vehicle, a bonding flange along an peripheral edge, and a baffle section between the central attachment section and the bonding flange. The closed-loop bonding section and the bonding flange are configured to define a substantially closed toroidal region therebetween. An attachment body is molded in-situ to substantially fill the toroidal region. As a result of the in-situ molding of the attachment body in the toroidal region, the trim panel and bladder member become bonded via the attachment body resulting in a high bonding strength.

10 Claims, 7 Drawing Sheets

Fig. 16

ACTIVE BOLSTER WITH SPINE REINFORCED WELD TRACK

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to active bolsters for occupant crash protection in automotive vehicles, and, more specifically, to increasing robustness of the bonding between an expandable bladder member and a trim wall which are separately molded.

An active bolster is a vehicle occupant protection device with a gas-inflatable bladder to absorb impacts and reduce trauma to occupants during a crash. As opposed to deployable air bag cushions that emerge from behind various openings upon inflation, active bolsters use the interior trim surface itself to expand at the beginning of a crash event for absorbing the impact and dissipating energy through the action of an inflation gas. U.S. Pat. No. 8,205,909, issued Jun. 26, 2012, incorporated herein by reference, discloses an active knee bolster integrated into a glove box door that is light weight and visually attractive. U.S. Pat. No. 8,474,868, issued Jul. 2, 2013, also incorporated herein by reference, discloses a typical active structure wherein an active bolster includes an outer wall or trim panel that faces a vehicle occupant attached to an inner wall or panel along a sealed periphery. One or both of the walls is deformable in order to provide an inflatable bladder. For example, the inner wall may have a pleated (i.e., accordion-like) region that straightens out during inflation. The walls are initially spaced apart by a small amount when in their pre-deployment, non-inflated condition. This allows ingress of the inflation gas in a manner that can achieve an even inflation across the panel.

The inner and outer walls of a typical active bolster are comprised of molded thermoplastics such as polyethylene, polyolefin, or PVC. They are typically injection molded but could also be blow molded. When formed separately, the walls must be hermetically joined around their periphery in order to form the inflatable bladder. The joint must be strong to resist separation as a result of the high pressures during inflation.

A known method of sealing the bladder walls is by hot welding, which involves heating of the matching surfaces and then compressing them together. Examples include hot plate welding, IR welding, and laser welding. A generally planar welding flange has been provided around the outer perimeter of an inner (bladder) wall which is received by a generally planar surface of an outer (trim) wall. The outer wall and/or inner surfaces may also include upstanding sealing ribs that increase the weld strength by penetrating and fusing with the welding flange or other opposing surface during the hot welding process in which the areas to be welded are heated and then compressed. Despite the penetration of the sealing ribs, weld separation has continued to be a potential failure mode for active bolsters.

SUMMARY OF THE INVENTION

In one aspect of the invention, an active bolster is provided for an interior trim surface of an automotive vehicle. A plastic-molded outer trim panel has a closed-loop bonding section on an inside surface. A plastic-molded expandable bladder member has a central attachment section configured to attach to a support structure of the vehicle, a bonding flange along an peripheral edge, and a baffle section between the central attachment section and the bonding flange. At least one of the bonding section or the bonding flange includes a plurality of circumferential ribs. The bonding section and the bonding flange are intermixed in a hot weld region by melting them together. A spine member is insert molded into one of the bonding section or the bonding flange. The spine member projects between adjacent circumferential ribs, wherein the spine member is unmelted by the hot welding of the bonding section and the bonding flange so that the intermixing of the bonding section and the bonding flange encapsulates a projecting portion of the spine member in the hot weld region.

DETAILED DESCRIPTION OF PREFERRED EMBODIMENTS

Figure 1:
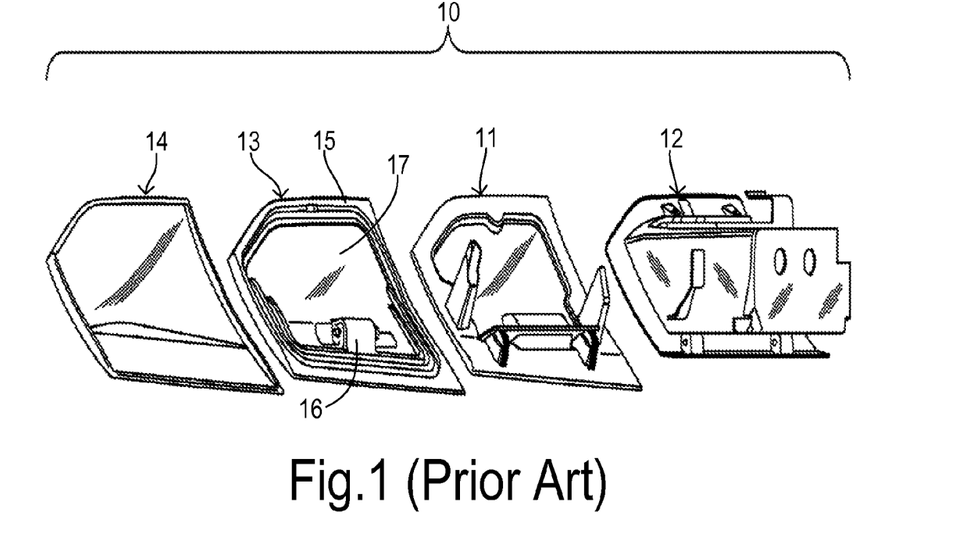
FIG. 1 is an outward-looking, exploded perspective view of a prior art active knee bolster glove box door system of a type to which the present invention can be applied.

Referring now to FIG. 1, a prior art active knee bolster system 10 has a base panel component 11 which forms the support structure or foundation for the bolster. Base 11 may be part of a glove box door which is attached to the vehicle by hinging from a storage cavity or glove box 12 as shown in FIG. 1. Alternatively, the active bolster can be mounted to another support structure such as an instrument panel support below a steering column, for example. Such locations interface to the knees of an individual riding in a corresponding seating position within a vehicle. The bolster may also be placed for protecting other body areas, such as a bolster mounted on a passenger door for torso protection.

Base 11 acts as a reaction surface for supporting an inflatable bladder formed by an inner wall (bladder member) 13 and an outer (trim panel) wall 14 that are joined around their periphery 15. Walls 13 and 14 are preferably comprised of molded plastics (such as thermoplastic polyolefin (TPO)) and are joined by plastic welding, such as hot plate welding, to form a peripheral seal around a central region 17 for forming a bladder. An inflation gas source (i.e., inflator) 16 is electronically controlled for activating during a crash to release gas to inflate the bolster. Outer wall 14 may comprise the Class A interior trim surface such as the outside of the glove box door, or an additional skin or cover (not shown) can be applied to its outer surface.

Figure 2:
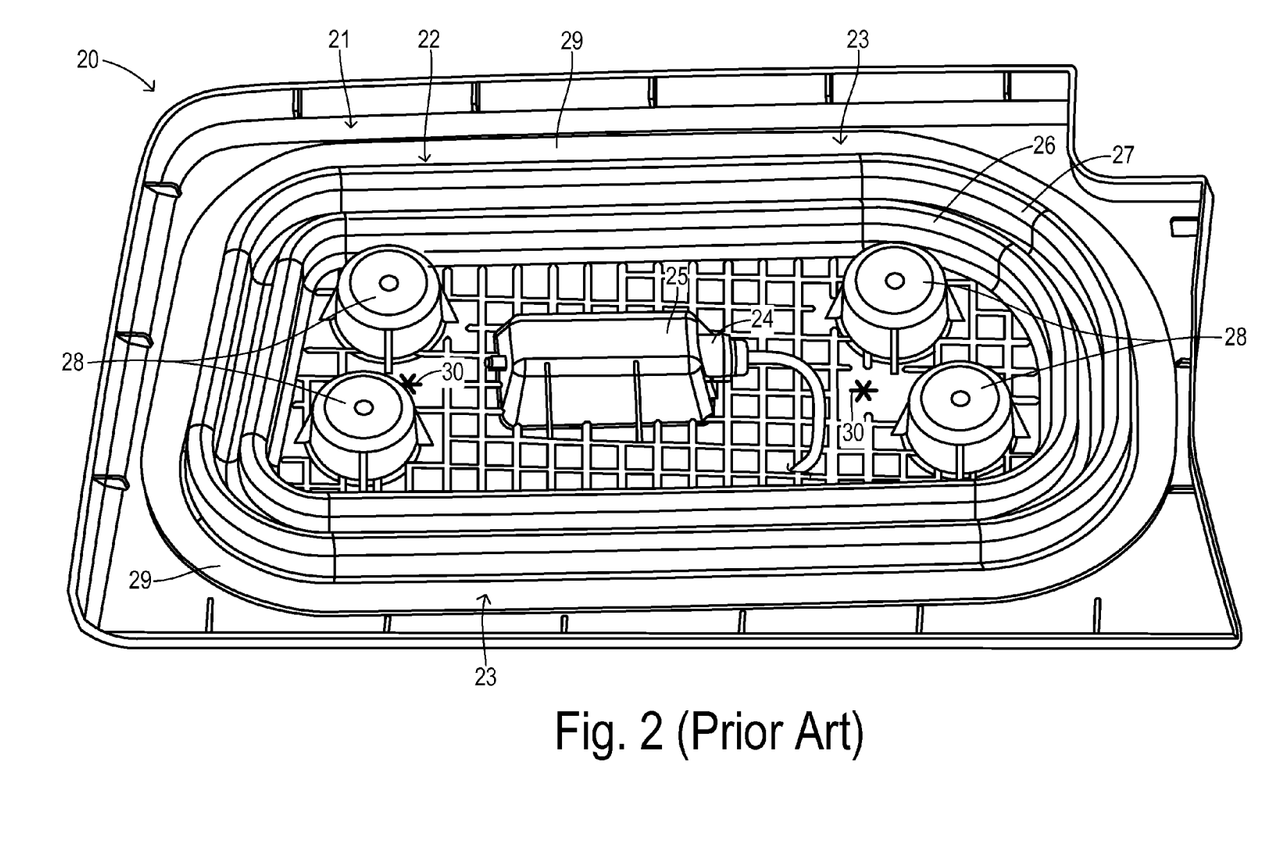
FIG. 2 is a rear perspective view of an outer trim panel and bladder wall assembly of a prior art active bolster.

FIG. 2 is a rear view of another prior art embodiment of an inflatable bladder 20. A plastic-molded outer trim panel wall 21 overlies a plastic-molded, expandable inner bladder wall 22. Walls 21 and 22 are joined around a closed perimeter region 23 to form an inflatable bladder having an open central volume between walls 21 and 22 to receive an inflation gas during a crash event from an inflator 24 mounted in a recess 25 of bladder wall 22. Bladder wall 22 includes a plurality of pleats, such as 26 and 27, to accommodate the expansion of bladder wall 22 during inflation. A plurality of bosses or towers 28 are used to mount bladder wall 22 to a vehicle support structure acting as a reaction surface. A welding flange 29 extends circumferentially around bladder wall 22. Vent holes 30 comprised of an asterisk-shaped pattern cut through bladder wall 22 may be included for venting the central volume prior to and during deployment. Other kinds of vents, such as an active vent, can also be employed.

Figure 3:
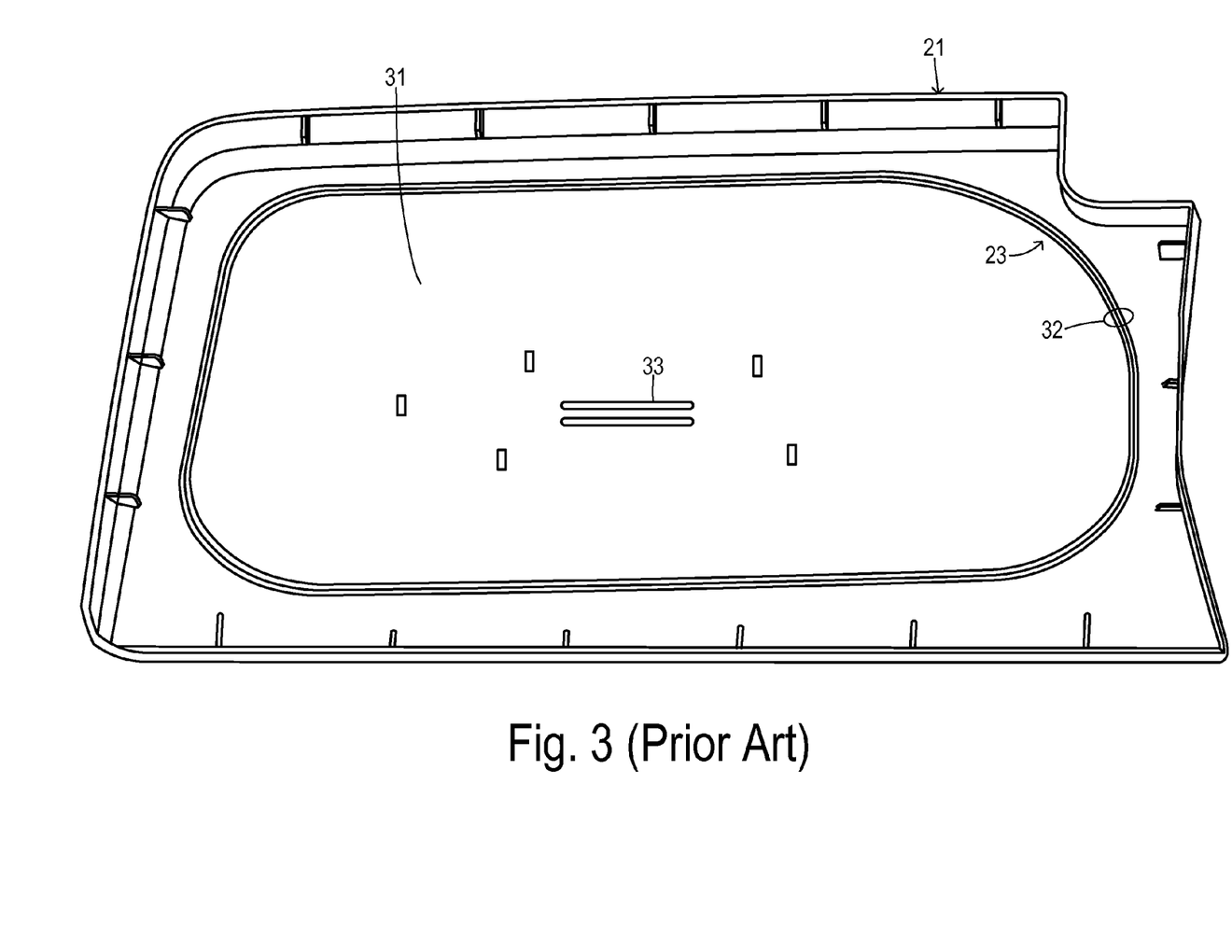
FIG. 3 is a perspective view of the prior art outer trim panel of FIG. 2 with the bladder wall removed.

FIG. 3 shows outer wall 21 with the inner bladder wall removed revealing a bladder surface 31 that faces the inner wall when assembled. A plurality of upstanding ribs 32 follow closed perimeter region 23 and are joined with flange 29 of inner bladder wall 22 (FIG. 2) by hot welding to create a hermetic seal for the inflatable bladder. Ribs 33 are provided for supporting the inflator.

Figure 4:
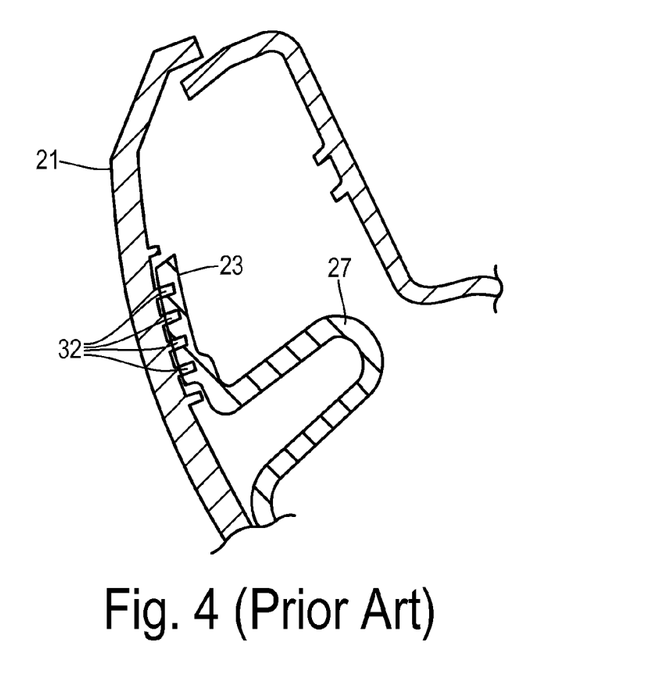
FIG. 4 is a cross-sectional view of a prior art welded joint between a trim panel and bladder wall.

FIG. 4 illustrates the welded joint between flange 29 and ribs 32 in greater detail. Due to the application of heat and pressure, ribs 32 preferably penetrate and bond with flange 23. During inflation, outer wall 21 moves outward while pleat 27 unfolds. Bladder expansion results in forces applied to the weld that tend to peel apart the weld.

In order to avoid certain disadvantages of the known welded joints, the present invention employs a spine member which is insert molded into one of the walls to be hot welded, so that the spine member is incorporated into the hot weld region in a manner that strengthens the weld.

Figures 5, 6:
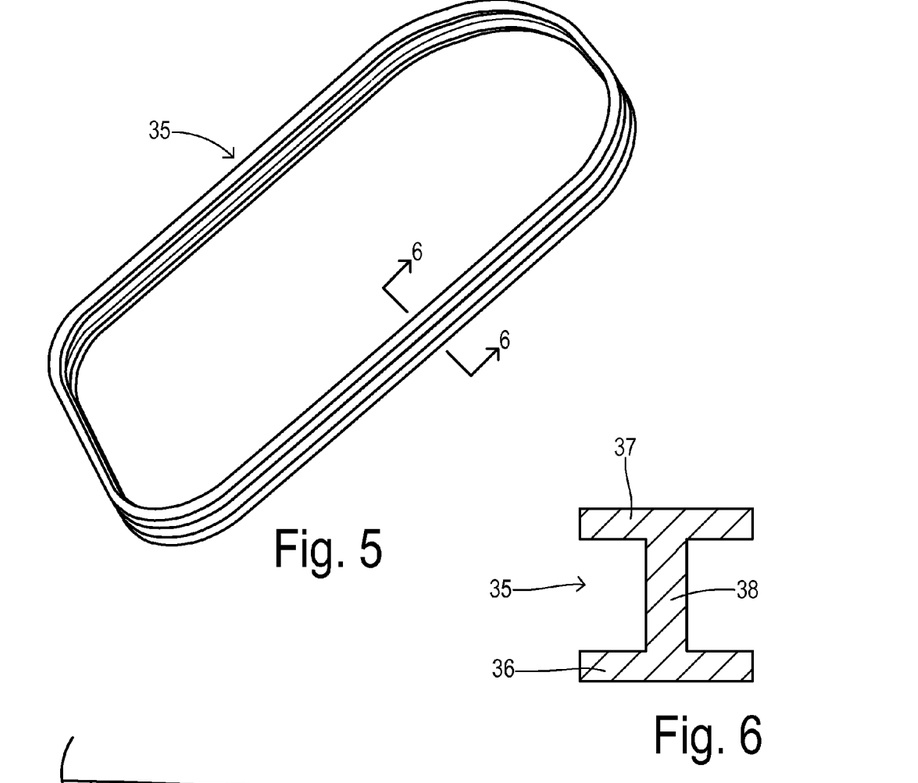
FIG. 5 is a perspective view of one embodiment of a spine member having an I-beam cross section prior to insert molding into an outer trim panel.
FIG. 6 is a cross-sectional view of the spine member along lines 6-6 of FIG. 5.

A first embodiment of a spine member 35 is shown in FIGS. 5 and 6 formed as a circumferential ring with an I-beam cross-section. Spine member 35 is preferably formed of a metal such as stainless steel or aluminum or a nonmetal material which remains unmelted at the temperatures employed when hot welding the plastic bladder and trim walls. As shown in FIG. 6, the I-beam cross-section includes a lower or embedded plate 36, an upper plate 37, and a center webbing 38 between plates 36 and 37. Spine member 35 has a ring shaped circumference in order to follow a weld track defined by circumferential ribs in one of the active bolster walls.

Figure 7:
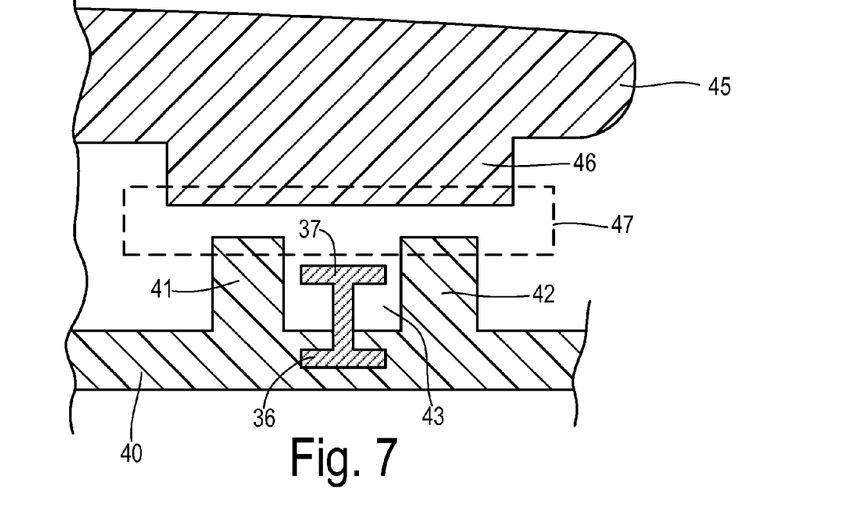
FIG. 7 is a cross-sectional view of one embodiment of an outer trim panel, insert-molded spine member, and inner bladder wall prior to hot welding.
Figure 8:
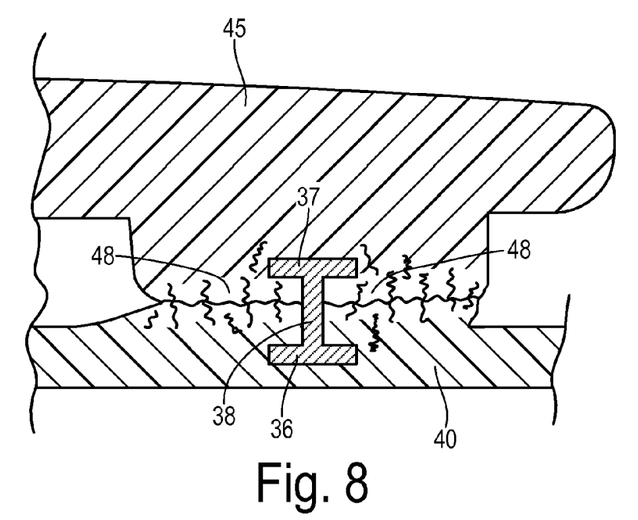
FIG. 8 is a cross-sectional view of the outer trim panel, spine member, and inner bladder wall of FIG. 7 after hot welding.

Preferably, the size of spine member 35 is adapted to fit inside a pair of adjacent circumferential ribs as shown in FIG. 7. Thus, outer trim wall 40 has a bonding section comprised of ribs 41 and 42 separated by an intervening gap 43. Lower plate 36 of spine member 35 is insert molded during the manufacture of wall 40 so that spine member 35 projects between ribs 41 and 42 with upper plate 37 exposed (preferably remaining within the profile of gap 43). An inner bladder wall 45 has a bonding flange 46 to be hot welded with ribs 41 and 42 by the heating of adjacent areas 47 during a hot welding process. As known in the art, a hot weld plate or other heat source is placed between the bonding section (ribs 41 and 42) and bonding flange 46 to contact and melt the corresponding plastic material. Once melted or softened, the hot plate is removed and then walls 40 and 45 are compressed in order to intermix the melted plastic material. As shown in FIG. 8, the walls melt together by intermixing in a hot weld region 48. Spine member 35 is unmelted so that intermixing of the plastic material from walls 40 and 45 encapsulates the portion of spine member 35 that initially projected between the circumferential ribs. Thus, upper plate 37 is encapsulated by intermixed material from walls 40 and 45 while lower plate 36 remains embedded in the portion of wall 40 that did not melt. The gap between adjacent ribs into which the spine member projects provides a space for the intermixing of the plastic material from both walls, thereby creating a weld with substantially increased strength as a result of reinforcement by the spine member.

Figure 9:
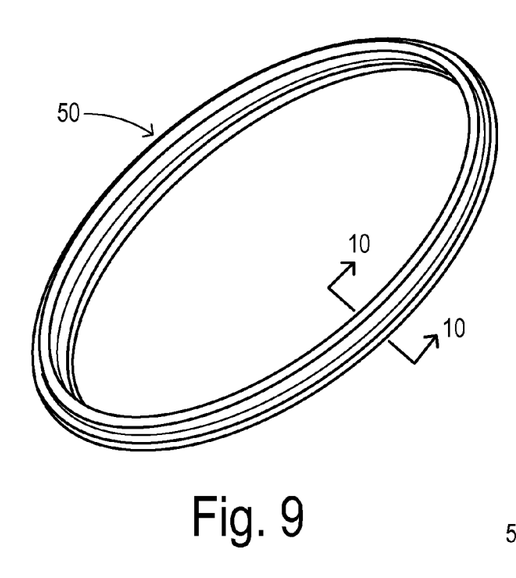
FIG. 9 is a perspective view of another embodiment of a spine member having a T-shaped cross section.
Figure 10:
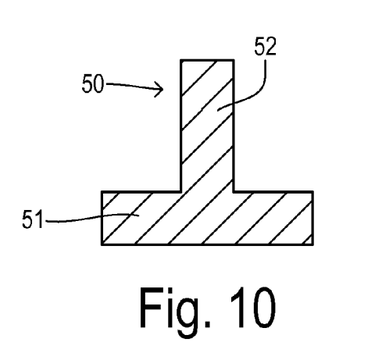
FIG. 10 is a cross-sectional view of the spine member of FIG. 9 along lines 10-10.
Figure 11:
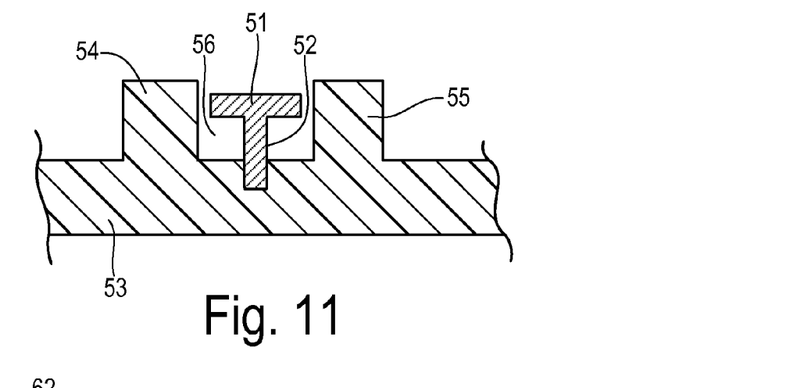
FIG. 11 is a cross-sectional view of the spine member of FIG. 9 insert molded in an outer trim wall.

FIGS. 9 and 10 shows another embodiment of a spine member 50 having a T-shaped cross-section. A center leg 52 is connected with an upper plate 51. As shown in FIG. 11, center leg 52 is embedded by insert molding into an outer trim wall 53 between adjacent circumferential ribs 54 and 55 to project into a gap 56, so that upper plate 51 is oriented toward a second wall (not shown) to be hot welded with ribs 54 and 55.

Figure 12:
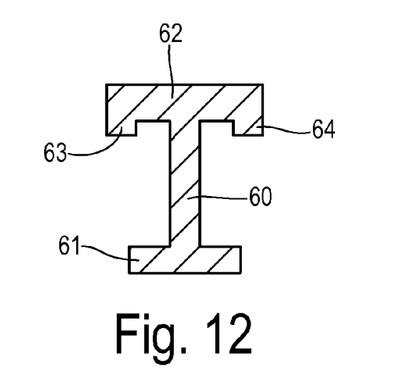
FIGS. 12-14 are cross-sectional views of other embodiments of the spine member with other cross-sectional shapes.
Figure 13:
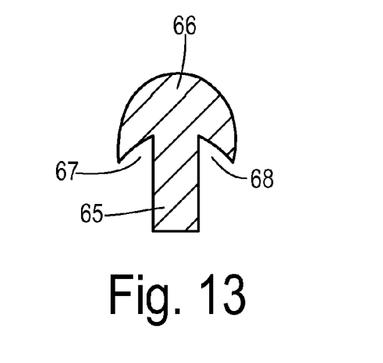

FIG. 12 shows a variation in the cross-section of a spine member wherein a center webbing 60 couples a lower plate 61 and an upper plate 62. Upper plate 62 has a pair of extensions 63 and 64 which are oriented to penetrate and grip into an intermixed region of hot welded plastic material that flows beneath upper plate 62, for example. In a similar manner, FIG. 13 shows an alternative embodiment wherein a center leg 65 connects with a curve upper plate 66 with angled extensions 67 and 68 to grip the intermixed plastic material of the hot weld to further increase the weld strength.

Figure 14:
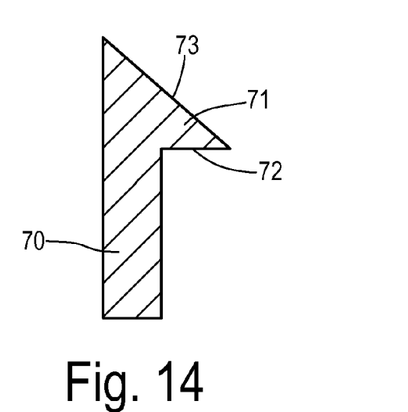
Figure 15:
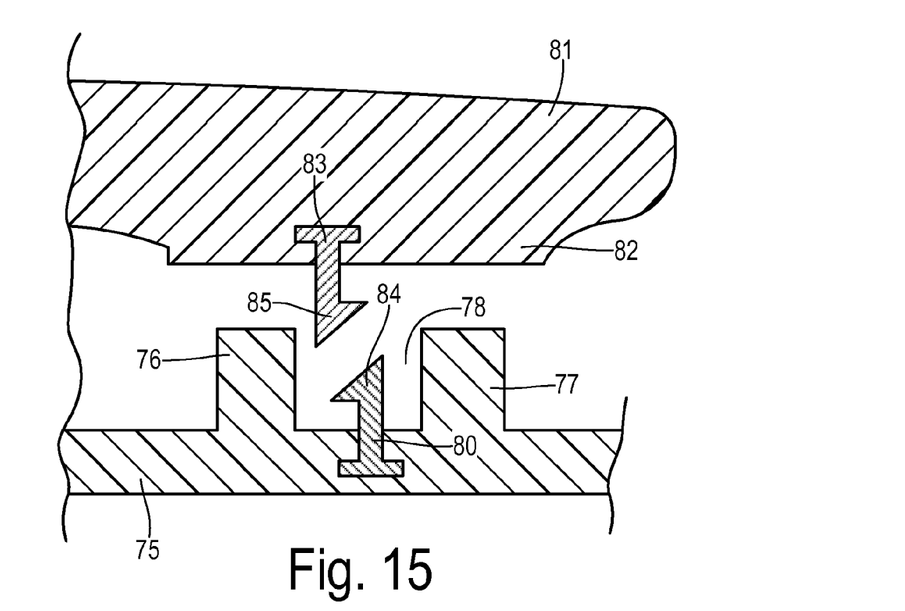
FIG. 15 is a cross-sectional view of another embodiment of an active bolster wherein an outer trim wall and an inner bladder wall each has an insert molded spine member.
Figure 16:
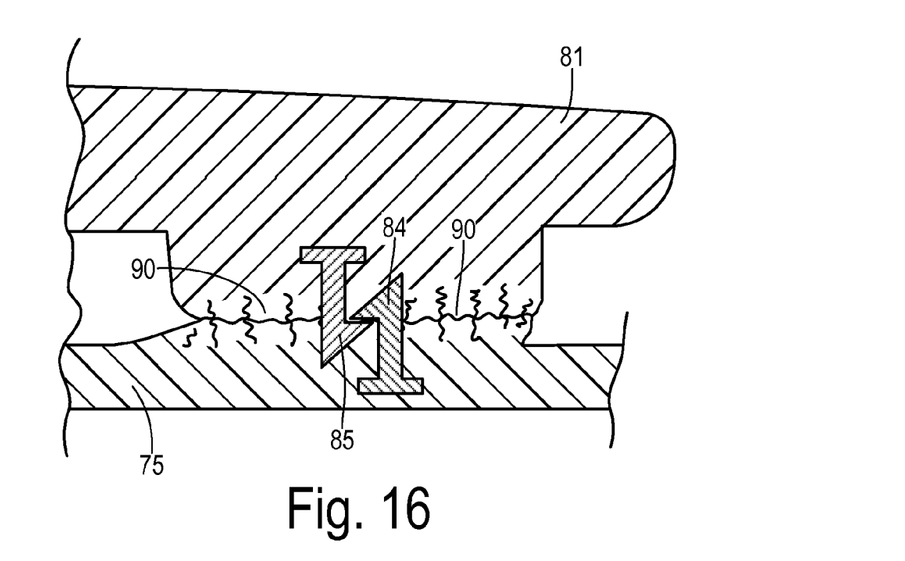
FIG. 16 is a cross-sectional view of the active bolster of FIG. 15 with interlocking spine members after hot welding.

FIG. 14 shows another version of a spine member with a leg 70 integrated with a locking end 71. End 71 has a deflection edge 73 and a ledge 72 which may be especially useful in an embodiment shown in FIGS. 15 and 16 wherein spine members are utilized in both the outer trim wall and inner bladder wall to be hot welded in an interlocking manner. Thus, FIG. 15 shows an outer trim wall 75 with circumferential ribs 76 and 77 and an intervening gap 78 to form a bonding section. A spine member 80 is insert molded with its locking end 84 extending into gap 78. Inner bladder wall 82 has a bonding flange 82 into which a spine member 83 is insert molded so that an interlocking end 85 projects toward gap 78. During hot welding, bonding flange 82 and ribs 76 and 77 are heated to their melting point and walls 75 and 81 are compressed with spine member ends 84 and 85 sliding along their angled faces until they snap together and become latched as shown in FIG. 16. Intermixing of the plastic material of the bonding flange and the circumferential rib bonding section of walls 81 and 85, respectively, encapsulates the interlocked spine members. Thus, bonding strength of the hot weld region is even further increased.

Many other cross-sectional shapes of the spine member could be used, such as arrowhead or barbed shapes. The spine member preferably forms a circumferential ring in order to reinforce the entire weld track around the bladder for the active bolster. However, a spine member can also be used over only a smaller arc portion of the circumferential bonding area in order to reinforce just those areas where concentrated forces may increase the likelihood of weld separation.

What is claimed is:

1. An active bolster for providing an interior trim surface of an automotive vehicle, comprising:
   a plastic-molded outer trim panel having a closed-loop bonding section on an inside surface;
   a plastic-molded expandable bladder member having a central attachment section configured to attach to a support structure of the vehicle, a bonding flange along an peripheral edge, and a baffle section between the central attachment section and the bonding flange, wherein at least one of the bonding section or the bonding flange includes a plurality of circumferential ribs, and wherein the bonding section and the bonding flange are intermixed in a hot weld region by melting them together; and
   a spine member that is insert molded into one of the bonding section or the bonding flange to project between adjacent circumferential ribs, wherein the spine member is unmelted by the hot welding of the bonding section and the bonding flange so that the intermixing of the bonding section and the bonding flange encapsulates a projecting portion of the spine member in the hot weld region.

2. The active bolster of claim 1 wherein the spine member is a circumferential ring.

3. The active bolster of claim 1 wherein the spine member is comprised of metal.

4. The active bolster of claim 1 wherein the spine member has an I-beam cross section with a lower plate joined to an upper plate by a center webbing, wherein the lower plate is embedded during insert molding, and wherein the upper plate is encapsulated in the hot weld region.

5. The active bolster of claim 1 wherein the spine member has a T-shaped cross section with a center leg and an upper plate, wherein the center leg is embedded during insert molding, and wherein the upper plate is encapsulated in the hot weld region.

6. The active bolster of claim 1 wherein the spine member comprises a first spine member injection molded in the outer trim panel; and
   wherein the active bolster further comprises a second spine member insert molded in the bladder member, and wherein both the first and second spine members are encapsulated by intermixing of the bonding section and the bonding flange.

7. The active bolster of claim 6 wherein the first and second spine members are configured with matching catch features that interlock during hot welding of the bonding section and the bonding flange.

8. An active bolster comprising:
   a trim panel having a closed-loop bonding section;
   a bladder member configured to attach to a vehicle and including a bonding flange along an peripheral edge and a baffle section radially inward of the bonding flange; and
   a spine member insert molded into the trim panel or bladder member having a projecting portion that is encapsulated by intermixing the bonding section and bonding flange in a hot weld region.

9. The active bolster of claim 8 wherein the closed-loop bonding section includes circumferential ribs projecting from an inside surface of the trim panel, and wherein the spine member is insert molded in the trim panel to project between the circumferential ribs.

10. The active bolster of claim 8 further comprising an inflator for delivering an inflation gas between the trim panel and bladder member to inflate the active bolster.

* * * * *